T. B. NISBET.
WINDSHIELD FOR AUTOMOBILES.
APPLICATION FILED JUNE 13, 1919.
Reissued June 1, 1920.
14,872.
2 SHEETS—SHEET 1.
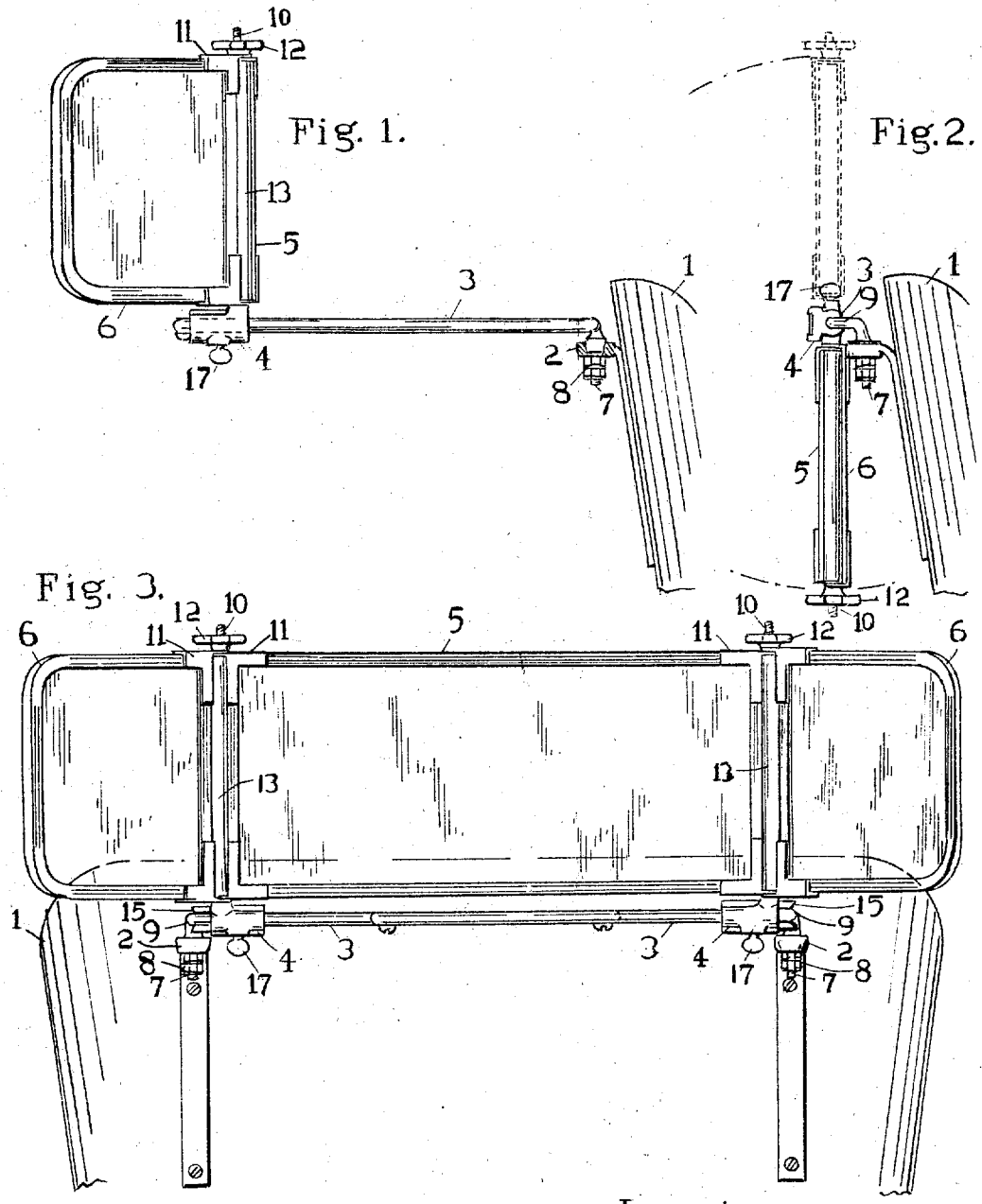
Inventor,
Theodore B. Nisbet
by Dorsey & Cole
Attorneys T. B. NISBET.
WINDSHIELD FOR AUTOMOBILES.
APPLICATION FILED JUNE 13, 1919.
Reissued June 1, 1920.
14,872.
2 SHEETS—SHEET 2.
Fig. 4.
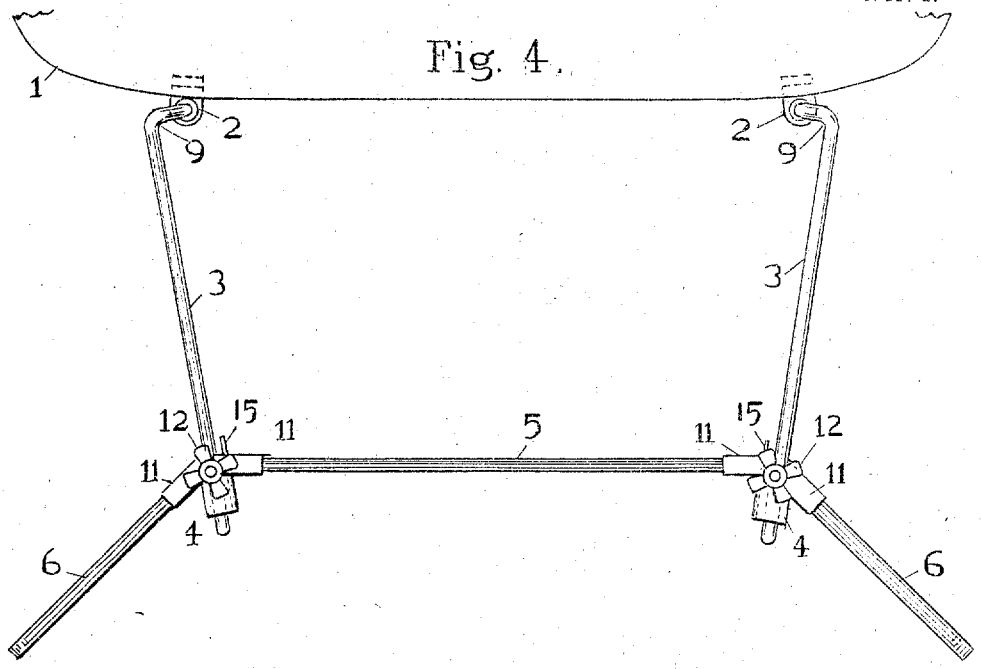
Fig. 5.
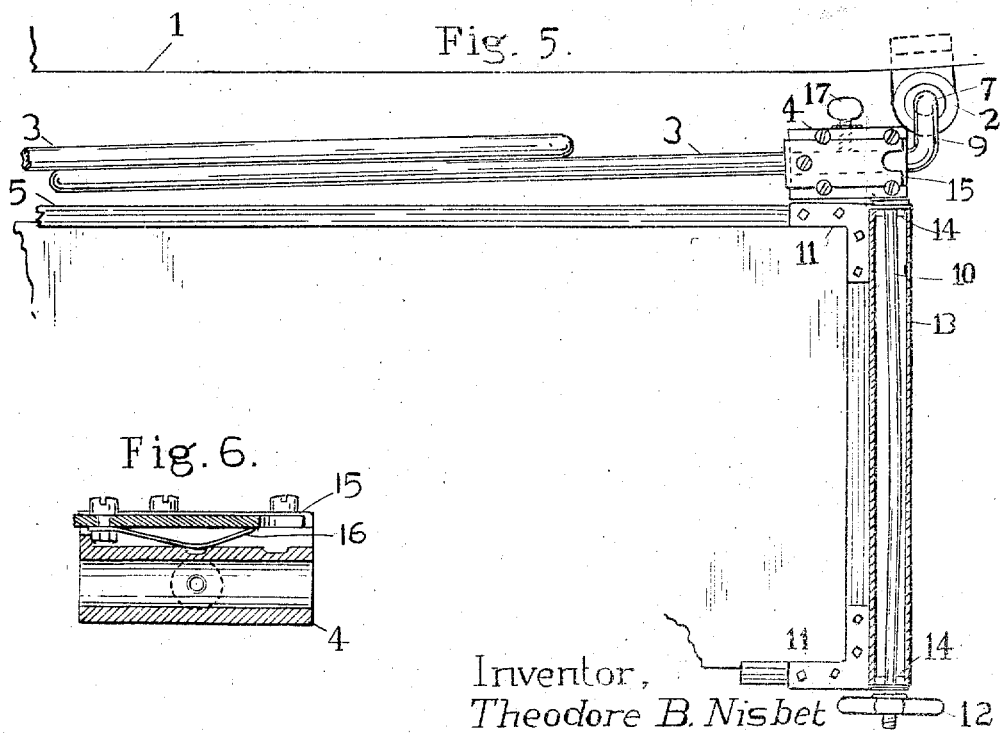
Fig. 6.
Inventor,
Theodore B. Nisbet
by Dorsey & Cole
Attorneys

UNITED STATES PATENT OFFICE.

THEODORE B. NISBET, OF IRVINGTON, NEW YORK.

WINDSHIELD FOR AUTOMOBILES.

14,872. Specification of Reissued Letters Patent. Reissued June 1, 1920.

Original No. 1,238,803, dated September 4, 1917, Serial No. 870,718, filed November 7, 1914. Application for reissue filed June 13, 1919. Serial No. 304,067.

*To all whom it may concern:*

Be it known that I, THEODORE B. NISBET, a citizen of the United States, and a resident of Irvington, in the county of Westchester and State of New York, have invented certain new and useful Improvements in Windshields for Automobiles, of which the following is a specification.

The object of this invention is to provide a wind-shield adapted for the protection of occupants of the second or other rear seats of an automobile, which shall be of simple construction, capable of ready adjustment, of being securely clamped in its adjusted position, and of being folded against the back of the seat in front when not in use.

In the accompanying two sheets of drawings which form a part of this application,—

Figure 1 is a side elevation of a wind-shield embodying my invention attached to the back of a vehicle seat and extended into position for use.

Fig. 2 is a side elevation showing the wind-shield folded down and in dotted lines in raised position.

Fig. 3 is a front elevation showing the wind-shield in raised position as in the dotted position of Fig. 2.

Fig. 4 is a plan showing the wind-shield in extended position.

Fig. 5 is a plan to enlarged scale broken away showing the wind-shield partially folded.

Fig. 6 is a section through a sleeve.

The front seat 1 of an automobile is shown in the drawings, the back of which serves as a point of attachment for brackets 2 2 which through relatively movable rods 3 3 and sleeves 4 4 support a main wind-shield 5 and auxiliary wind-shields 6 6. The relatively movable rods are round and are pivoted on the brackets so that they may be swung about vertical axes and in a horizontal plane. One end 7 of each rod is downwardly bent and this portion is coned to insure a joint which will be a snug fit and in which the wear can be taken up by drawing the cones into the brackets with the nuts 8 8. The rods have short horizontal bends 9 9 close to their pivots, and beyond the bends are straight and serve as supporting guides on which the sleeves can slide and rotate. The sleeves carry hinge pins 10, 10 which engage hinge ears formed on sheet metal stampings of corner brackets 11 11 for both the main and auxiliary windshields. hand-nuts 12 12 on the ends of the hinge pins clamp together in any adjusted position the main and the auxiliary wind-shields and the sleeves, all connected by the hinge pins. The space between the hinge ears is spanned by a tube 13, which when the nut is screwed down, transmits the thrust from the upper to the lower pairs of ears and clamps the latter against the sleeve, thereby holding the main and auxiliary wind-shields in their relation to the sleeve as well as in their relation to each other. It is only when the relatively movable rods are folded against the seat that the wind-shield frames need to be folded up and down along the dotted circular path indicated in Fig. 2, and the construction is such that this is permitted by the turning of the sleeves on the rods. As automobiles are usually proportioned the required extension of the wind-shield back of the seat to which the brackets are attached requires rods of such length that they will overlap when folded against the seat which overlapping unless provided for would result in placing the hinges on the respective sides of the wind-shield out of alinement so that the axes of the sleeves could not be brought into such exact alinement as would ordinarily be necessary to permit the folding. The hinge-pins while supported by the sleeves have sufficient relative movement with respect to the sleeves to compensate for the want of alinement, by reason of their being flexible so that they will bend and permit the sleeves to be swung out of alinement sufficiently to allow for the departure from alinement of the overlapping rods when in folding the wind-shield between its raised or erect and lowered or pendant positions it passes the horizontal position shown in Fig. 5. The tubes are also sufficiently large to give space within for the rods to spring and also to enlarge the rings of pressure when the parts are clamped so as to increase the friction leverage. Shoulders 14 14 are formed on the hinge ears to hold the tube properly centered. Each sleeve also carries a forked bolt 15, the forked ends of which may be made to engage the short horizontal bend of the relatively movable rod on which it slides if it is desired to securely hold up the wind-shield when it is not extended and while the rods are folded against the back of the seat where they are pivoted. The bolt is held from accidental shifting in either retracted or extended position by a spring 16. When the wind-shield is extended wholly or partially it is securely locked in its upright position by reason of the sleeves not being in alinement. Any looseness in the sleeves is taken up by thumb-nuts 17 17 to eliminate rattling.

The foregoing detailed description has been given for clearness of understanding and no undue limitation should be deduced therefrom, but the appended claims should be construed as broadly as permissible in view of the prior art.

What I claim as new, and desire to secure by Letters Patent of the United States is:—

1. The combination of a pair of rods, each movable in a horizontal plane and capable of being brought into a mutually overlapping position, sleeves slidably and rotatably mounted on said rods, and a wind-shield carried by and connecting the sleeves and movable therewith around the axes of the rods from an erect to a pendant position in respect to said axes.

2. The combination of a pair of rods each movable in a horizontal plane and capable of being brought into a mutually overlapping position, sleeves slidably and rotatably mounted on said rods, hinge pins affixed to said sleeves, and a wind-shield having hinge ears engaging said hinge pins, substantially as described.

3. The combination of a pair of rods, each pivoted to move in a horizontal plane and into a mutually overlapping position, sleeves slidably and rotatably mounted on the rods, a wind-shield carried by the sleeves, the connection between the wind-shield and rods being sufficiently flexible to permit the rotation of the sleeves together about the rods when overlapped without substantial distortion of the shield connecting the two sleeves.

4. The combination of a pair of relatively movable rods each of which is pivoted to move in a horizontal plane and capable of being brought into an overlapping position, sleeves slidably mounted upon the rods and movable longitudinally thereof, a wind-shield with hinge ears and hinge pins for engaging the hinge ears supported by the sleeves, the hinge pins being sufficiently flexible to permit the wind-shield to be folded around the rods when they are in approximate alinement, substantially as described.

5. The combination of a pair of relatively movable rods each of which is pivoted to move in a horizontal plane and capable of being supported by and folded against the back of a vehicle seat, sleeves slidably mounted upon the rods, a wind-shield, hinge connections between the wind-shield and the sleeves, bolts slidably carried by the sleeves and means engageable by the bolts when the rods are folded against the seat for positively holding the wind-shield in an upright position, substantially as described.

6. The combination of a pair of relatively movable rods each of which is pivoted to move in a horizontal plane and capable of being brought into an overlapping position, sleeves slidably mounted upon the rods and movable longitudinally thereof, a wind-shield comprising a main shield and a plurality of auxiliary shields, hinges connecting the main shield with the auxiliary shield comprising wing members and connecting pins, tubes located between the co-functioning hinges and surrounding the pins, the pins being supported by and relatively movable with respect to the said sleeves whereby the wind-shield with the sleeves may be folded around the rods when they are in approximate alinement, substantially as described.

Signed at New York, this 11th day of June, 1919.

THEODORE B. NISBET.